United States Patent [19]

Haber

[11] Patent Number: 5,896,379

[45] Date of Patent: Apr. 20, 1999

[54] NETWORK NODE FOR PACKET SWITCHING WITH SELECTIVE DATA PROCESSING AND METHOD THEREFOR

[75] Inventor: William J. Haber, Tempe, Ariz.

[73] Assignee: Motorola, Inc., Schaumburg, Ill.

[21] Appl. No.: 08/703,413

[22] Filed: Aug. 26, 1996

[51] Int. Cl.$^6$ ............................................ H04L 12/56
[52] U.S. Cl. ............. 370/390; 370/400; 395/200.31; 395/200.68
[58] Field of Search ........................ 370/390, 400, 370/415, 351, 389, 395, 396; 395/200.3, 200.31, 200.6, 200.68, 200.79

[56] References Cited

U.S. PATENT DOCUMENTS

| | | |
|---|---|---|
| 5,235,595 | 8/1993 | O'Dowd ............................ 370/392 |
| 5,477,536 | 12/1995 | Picard .............................. 370/400 |
| 5,487,061 | 1/1996 | Bray ................................ 370/252 |
| 5,613,069 | 3/1997 | Walker ......................... 395/200.68 |

*Primary Examiner*—Alpus H. Hsu
*Attorney, Agent, or Firm*—Gregory J. Gorrie

[57] ABSTRACT

A packet switching communication network (10) includes a number of switching nodes (16). The switching nodes include a switch (18) and at least one data processor (20). When selected packets (34), as identified by routing codes (40), arrive at one of the switching nodes (16), they are passed (58) to the data processor (20). The data processor (20) is configured to perform a network processing function, such as packet broadcasting (74) or error correction (60). In performing these functions, user data (38) conveyed by the selected packets (34) are processed to generate processed packets. The processed packets are re-introduced to the switch (18) and routed onto their destinations.

16 Claims, 4 Drawing Sheets

NETWORK NODE FOR PACKET SWITCHING WITH SELECTIVE DATA PROCESSING AND METHOD THEREFOR

FIELD OF THE INVENTION

This invention relates generally to packet switched data communication networks. More specifically, this invention relates to network packet switching nodes that selectively perform data processing functions on data conveyed in packets.

BACKGROUND OF THE INVENTION

Communication networks include a collection of resources that are employed to transport user information from source nodes to destination nodes. The resources include switching nodes and communication links. In a packet switching network, user information takes the form of packetized digital data. The user information is carried in discrete individual packets, and each individual packet carries its own destination address along with at least a portion of the user information. Switching nodes evaluate the destination addresses to determine how to appropriately route the packets.

Services providers which operate communication networks as well as their users benefit from improved network efficiency. Service providers want improved efficiency because they can generate greater revenue by transporting a greater amount of user information using a given collection of network resources. Users want improved efficiency because the costs of providing the network resources can then be spread over a greater number of user information transfers to lower the costs of transporting any single item of user information.

Unfortunately, conventional packet switching and other networks are operated in a relatively inefficient manner. Inefficiencies are particularly onerous in connection with the consumption of communication links to transport redundant or nearly redundant user information. The portion of link bandwidth which is used to transport redundant or nearly redundant user information cannot be used to transport more independent user information, and this results in an inefficient use of network resources.

The transportation of redundant or nearly redundant user information results, at least in part, from the tendency of conventional networks to view the processing of user information as a user responsibility. For example, when a single source node wishes to broadcast certain user information to a number of destination nodes, the source rode has the responsibility of duplicating and separately transmitting packets as needed for each destination node. Many network communication links and switching nodes repetitively handle substantially the same data merely addressed to different destinations.

Likewise, error detection and correction of user information is conventionally performed by users on an end-to-end basis. A source node encodes user data so that certain errors may be detected and perhaps corrected. The destination node decodes the encoded data to check for errors. In typical data communication protocols, when errors cannot be corrected the destination node returns a message to the source node requesting repetition of at least certain portions of the user data. The conditions which lead to errors in the first place may still be present during a repeated transmission, and a good likelihood exists that user data is transmitted several times before the destination node can make a reconstructed error-free version of the user data.

These are only two of many examples where conventional communication network resources are inefficiently utilized.

While the problems associated with the inefficient use of network resources plague a wide variety of communication networks, they have more serious consequences in networks which rely on RF communication links. Such links may, for example, trunk communications between ground stations and satellites, between pairs of satellites, or between pairs of ground stations. RF communication links are constrained to using an assigned portion of the electromagnetic spectrum, and this assigned portion is a scarce resource which should be managed efficiently. In addition, the efficient use of RF communication links dictates decreasing link margins to increase communication traffic thoughput. When a desirable balance is found between link margin and communication traffic throughput, noise will cause data errors on occasion. These data errors lead to the redundant and inefficient use of communication links through end-to-end error detection and correction schemes.

BRIEF DESCRIPTION OF THE DRAWINGS

A more complete understanding of the present invention may be derived by referring to the detailed description and claims when considered in connection with the figures, wherein like reference numbers refer to similar items throughout the figures, and:

DETAILED DESCRIPTION OF THE DRAWINGS

Figure 1:
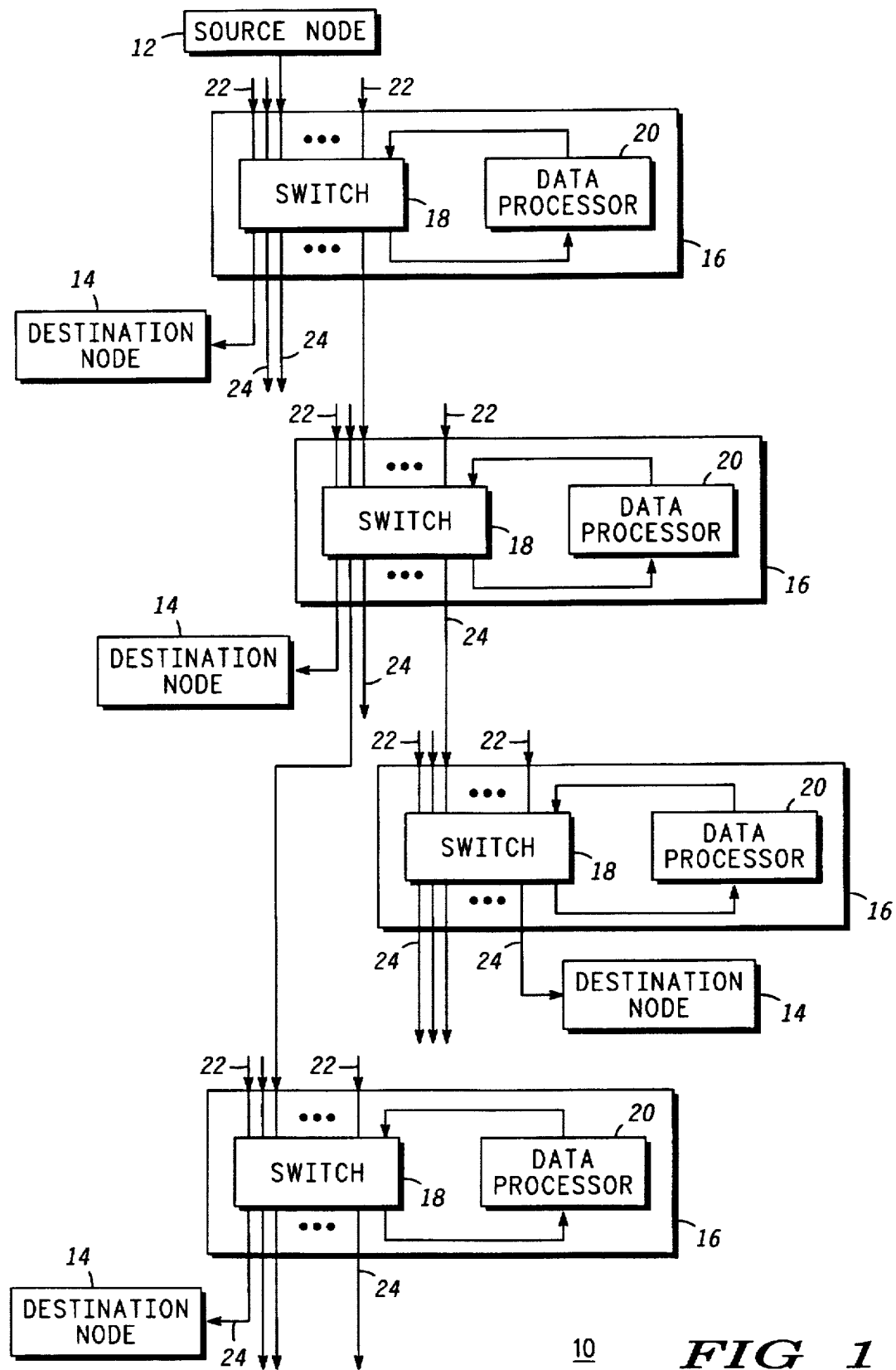
FIG. 1 shows a layout diagram of a packet switching communication network.

FIG. 1 shows a layout diagram of a packet switching communication network 10. Network 10 includes any number of user nodes, which FIG. 1 depicts as source nodes 12 and destination nodes 14, and any number of intermediate switching nodes 16. Nothing requires the user nodes to act exclusively as source nodes 12 or destination nodes 14. The source and destination node designations are provided to illustrate example scenarios which are described below.

Generally, source node 12 generates user information. The user information is digitized and packetized then given to network 10 to be transported to one or more intended destination nodes 14. The packetized user information, or packets, include a network address of the intended destination node or nodes 14. Switching nodes 16 evaluate this network address to route the packets to the one or more intended destination nodes 14. As indicated in FIG. 1, a diverse assortment of routes may be followed in transporting packets from source node 12 to destination nodes 14. The packets originally formed at source node 12 may traverse any number of switching nodes 16 before arriving at an intended destination node 14.

In the preferred embodiments of the present invention, at least some of switching nodes 16 in network 10 include a switch 18 and a data processor 20. Each switch 18 includes any number of input ports 22 and any number of output ports 24. Input ports 22 couple to source nodes 12 and to output ports 24 from other switching nodes 16. Output ports 24 couple to destination nodes 14 and input ports 22 of other switching nodes 16. FIG. 1 depicts only an arbitrary few connections to switching node input and output ports 22 and 24, respectively, for the sake of clarity. Those skilled in the art will appreciate that such connections may be implemented using RF links, fiber optic links, wired cable links, and the like. In a manner well known to those skilled in the art, each switch 18 dynamically connects its input ports 22 to its output ports 24 so that connections are formed through switch 18. Switches 18 typically perform a switching or routing function for network 10. In other words, switches 18 desirably refrain from modifying user data conveyed by packets.

Within the domain of a switching node 16, data processor 20 has an input which couples to an output port 24 of switch 18 and an output which couples to an input port 22 of switch 18. Data processor 20 performs a non-switching network processing function, and that network processing function applies to user data conveyed by packets.

The precise network processing function performed by data processor 20 depends upon system requirements. Different switching nodes 16 may perform the same or different functions, and any single switching node 16 may perform more than one function. In order to reduce switching node 16 complexity, a data processor 20 is not dedicated to each input port 22 or output port 24 of switch 18. Rather, selected packets which require the network processing functions performed by a data processor 20 are switched or routed to the data processor 20 to receive the required processing.

Data processor 20 may, as one example, be configured to perform a broadcast data network processing function. In this example, setup messages are sent to switching nodes 16 prior to broadcasting packets. The setup messages define a group of nodes to which a switching node 16 should broadcast packets. Source node 12 then forms packets addressed to a specified group address. Data processors 20 in various switching nodes 16 desirably duplicate these group-addressed packets as needed and send the duplicated packets to local destination nodes 14 and local switching nodes 16 only. Other packets being transported within network 10 do not receive this duplication data processing. Instead of source node 12 duplicating packets and sending many nearly redundant packets to different addresses over common links, each link desirably transports only a single packet addressed either to a group or a destination node. This broadcast data network processing function is discussed in more detail below.

Data processor 20 may, as another example, be configured to perform an error correction network processing function. In this example, "high quality" packets may be selected to receive the error correction data processing. Other packets being transported within network 10 do not receive the error correction processing. Data processor 20 performs convolutional or other error detection and/or correction schemes to detect and correct errors in the packet and re-encodes the packet after error correction for subsequent error correction processes. Instead of having packets experience an entire journey between source node 12 and destination node 14 before error correction is performed, error correction is distributed throughout network 10 and performed after small hops of the entire journey. Rather than have errors accumulate throughout the entire journey, errors are corrected before significant accumulation occurs. Moreover, retransmissions necessitated by errors which cannot be corrected need not be transmitted over the entire journey but only over a small hop where an error occurred. This error correction network processing function is discussed in more detail below.

Another example network processing function implemented in a data processor 20 may include a test and measurement function which echos selected packets back to a node which sent the packets. Still other examples may provide decryption and encryption functions, wiretap functions, and the like.

Figure 2:
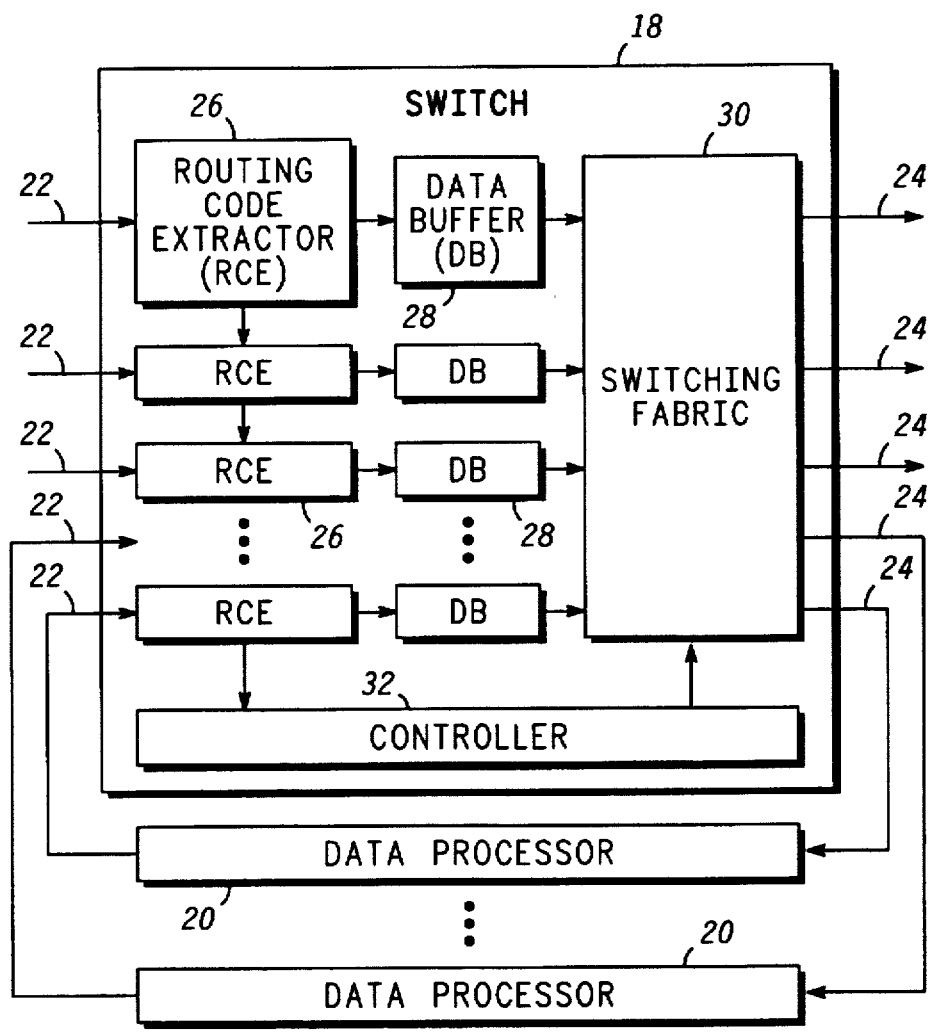
FIG. 2 shows a block diagram of a switching node used in the packet switching communication network.

FIG. 2 shows a block diagram of switching node 16. As discussed above in connection with FIG. 1, switching node 16 includes a switch 18 and a data processor 20. More specifically, FIG. 2 illustrates an embodiment in which switching node 16 includes a number of data processors 20. Each data processor 20 has an input which couples to its dedicated output port 24 of switch 18 and an output which couples to its dedicated input port 22 of switch 18. Any number of data processors 20 can be included. The different data processors 20 can perform identical functions to increase a switching node's capability to perform the function or can perform different functions altogether.

Each input port 22 of switch 18 couples to its dedicated routing code extractor (RCE) 26. Each routing code extractor 26 couples to its dedicated data buffer (DB) 28, and each data buffer 28 couples to its dedicated input port of a switching fabric 30. Output ports of switching fabric 30 serve as output ports for switch 18. Outputs from routing code extractors 26 couple to a controller 32, and a control output from controller 32 couples to switching fabric 30.

Figure 3:
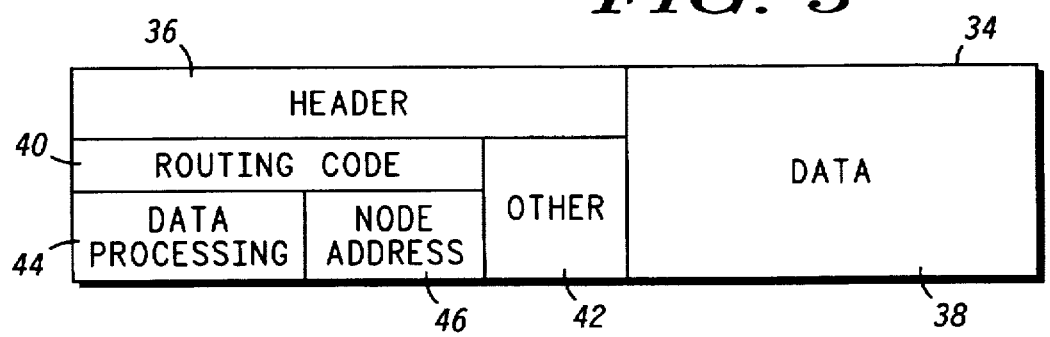
FIG. 3 shows a format diagram of a packet transported by the packet switching communication network.

FIG. 3 shows an format diagram of an exemplary packet 34 transported by packet switching communication network 10 through switching nodes 16 (see FIGS. 1 and 2). Packet 34 includes a header portion 36 and a data portion 38. Header 36 carries overhead or network-related data. Data portion 38 carries user data. It is the conveyance of this user data that forms the purpose for network 10. Header 36 may be divided into a routing code 40 and other overhead data section 42. Other data section 42 may carry a packet ID or serial number, an address of source node 12, addresses of one or more prior nodes of network 10 through which packet 34 has passed, and the like.

Routing code 40 may be further divided into a data processing section 44 and a destination address section 46. Destination address section 46 conveys the address of a destination node 14. However, for a packet 34 which is to be broadcast to many destination nodes 14, destination address section 46 may instead convey an identity of a group to which packet 34 is to be broadcast rather than a single destination node address. Data processing section 44 provides a code which selectively instructs switching node 16 whether to perform the network processing function provided by data processor 20 and which function or functions to perform if multiple data processors 20 are included in a switching node 16. Hence, data processing section 44 of routing code 40 is used by controller 32 in determining how to route packets through switching fabric 30.

Referring to FIGS. 2 and 3, when a packet 34 is received at any input port 22, including input ports 22 driven by data processors 20, a corresponding routing code extractor 26 extracts routing code 40 from the packet 34. Routing code 40 is passed to controller 32 for evaluation while the packet 34 is passed to a corresponding data buffer 28. Controller 32 is a programmable device well known in the packet switching arts. Controller 32, under the influence of a program which is discussed below, performs a control process that determines how to route the packet 34 through switching fabric 30. Switching fabric 30 represents a conventional fabric structure which is capable of connecting its input ports to its output ports in a pattern dictated by controller 32. Crossbar, banyan, knockout, and other switching structures known to those skilled in the art may all be successfully adapted for use in switching fabric 30.

In accordance with the evaluation of routing code 40, controller 32 causes switching fabric 30 to make the desired connection. Data buffer 28 synchronizes the packet 34 so that the packet 34 arrives at an input port of switching fabric 30 at the appropriate time after controller 32 has evaluated routing code 40 and commanded switching fabric 30 to make the desired connection.

Figure 4:
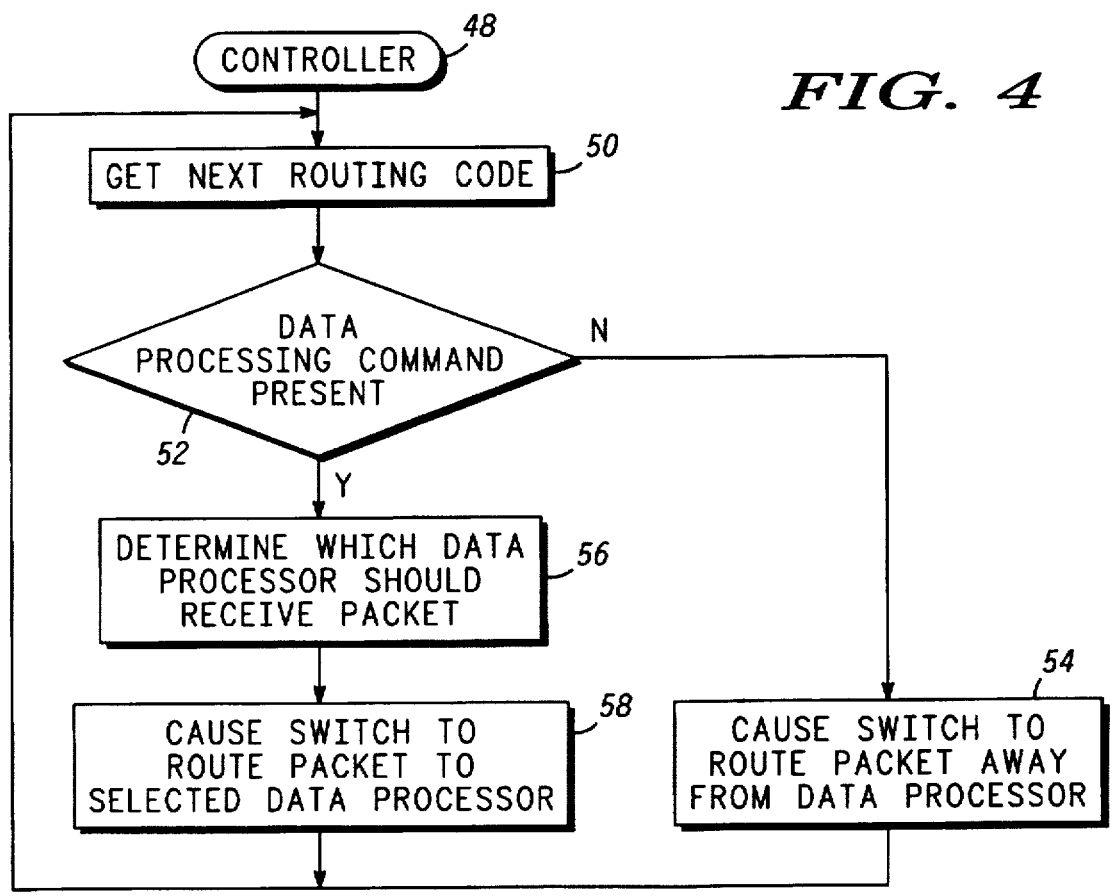
FIG. 4 shows a flow chart of a process performed at a controller portion of the switching node.

FIG. 4 shows a flow chart of a control process 48 performed at controller 32 to evaluate routing codes 40. Process 48 is desirably defined through programming instructions in a manner well known in the art.

Process 48 includes a task 50, during which a routing code 40 is obtained. For convenience, FIG. 4 depicts process 48 as evaluating a single routing code 40 at a time, then repeating to evaluate another routing code 40. Thus, task 50 may get the next available routing code 40, and this next routing code 40 may be supplied from the next input port 22 of switch 18 to be evaluated. However, process 48 may alternately be configured to evaluate many routing codes 40 in parallel.

After task 50, a query task 52 determines whether a data processing command is present in the routing code 40 being evaluated. Task 52 evaluates data processing section 44 (see FIG. 3) of routing code 40 in making its determination. Task 52 may also evaluate the particular input port 22 (see FIG. 2) with which the routing code 40 is associated and whether a requested network processing function is provided at the switching node 16 where process 48 is being performed.

If no data processing commands are present, if data processing commands for functions not provided at the switching node 16 are discovered, or if commands instruct the performance of a function just performed on the packet, as determined by the input port 22 from which a routing code 40 was received, then a task 54 is performed. Task 54 evaluates destination address section 46 (see FIG. 3) of the routing code 40. In response to this evaluation, task 54 provides a control output to switching fabric 30 (see FIG. 2) that causes switching fabric 30 to route the packet 34 away from data processors 20 and toward the destination for the packet 34. After task 54, program control loops back to task 50 to evaluate the next routing code.

When task 52 encounters a routing code 40 that commands the performance of a network processing function performed at switching node 16, a task 56 is performed. Task 56 determines to which data processor 20 the packet 34 should be routed. Task 56 desirably implements a prioritization scheme to choose a single data processor 20 when multiple data processors 20 are available at switching node 16. If multiple data processors 20 perform identical functions, then task 56 desirably tracks which data processors 20 are available to perform their network processing function on packets 34 at each given instant and selects an available data processor 20. Moreover, task 56 desirably monitors the input port 22 from which the routing code 40 comes. Task 56 desirably takes steps to prevent a packet which has just been processed by a data processor 20 from being routed back to that same data processor 20.

Following task 56, a task 58 provides a control output to switching fabric 30 (see FIG. 2) that causes switching fabric 30 to route the packet 34 to the selected one of data processors 20. After task 58, program control loops back to task 50 to evaluate the next routing code 40. Accordingly, through process 48, controller 32 (see FIG. 2) evaluates routing codes 40 (see FIG. 3) and selectively routes packets 34 (see FIG. 3) onward toward their destinations or to a data processor 20 which will perform a network processing function on the data 38 (see FIG. 3) conveyed by the packets 34.

Figure 5:
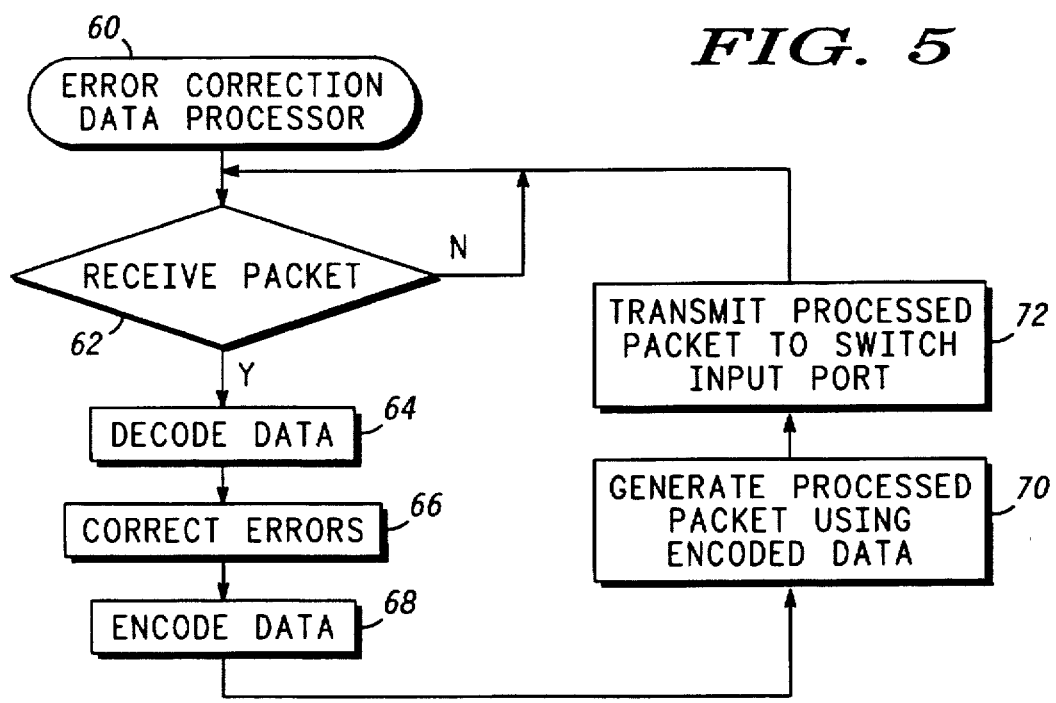
FIG. 5 shows a flow chart of an error correction data processor process performed at a first embodiment of a data processor portion of the switching node.

FIG. 5 shows a flow chart of an exemplary error correction data processor process 60 performed at a data processor 20 which is configured to correct errors in selected packets 34 (see FIG. 3). Process 60 may be defined through programming instructions or in other ways well known in the art.

Process 60 includes a query task 62 which determines when a selected packet 34 which requires error correction arrives at data processor 20. Such a selected packet 34 arrives at data processor 20 through the operation of controller process 48 and switch 18, discussed above in connection with FIGS. 2–4. Process 60 progresses beyond task 62 to a task 64 when the packet 34 is received. Task 64 decodes packet data 38 (see FIG. 3) using well known convolutional decoding, checksum, parity, Trellis, or other techniques.

Next, a task 66 performs any error correcting indicated in response to decode data task 64 if possible. Although not shown, if errors are too great to be corrected, task 66 can format and send a message requesting either the source node 12 (see FIG. 1) or the previous switching node 16 from which the packet 34 was received to retransmit the packet 34. After task 66 has corrected errors, a task 68 encodes data 38 so that subsequent nodes in network 10 can perform similar error correction processes. Next, a task 70 generates a processed packet using the data 38 encoded above in task 68 and optionally saves a copy of the processed packet so that it may be retransmitted if necessary. After task 70, a task 72 transmits the processed packet to the input port 22 of switch 18 (see FIGS. 1–2). Switch 18 will route the processed packet onto its destination node 14 (see FIG. 1).

After task 72, program control loops back to task 62 to await the arrival of the next selected packet 34 which requires error correction. While FIG. 5 depicts process 60 as sequentially processing single packets 34, those skilled in the art will appreciate that process 60 can also be configured to process several packets 34 in parallel. Regardless of a specific implementation, process 60 corrects data errors in selected packets 34. When process 60 is performed at several different switching nodes 16 (see FIGS. 1–2) throughout network 10, a high quality transmission path results. Any errors which creep into data 38 due to transmission are corrected quickly and not allowed to accumulate. If retransmissions are required, the retransmissions can travel over a short span of network 10 and do not need to travel over the entire journey between source node 12 and a destination node 14.

Figure 6:
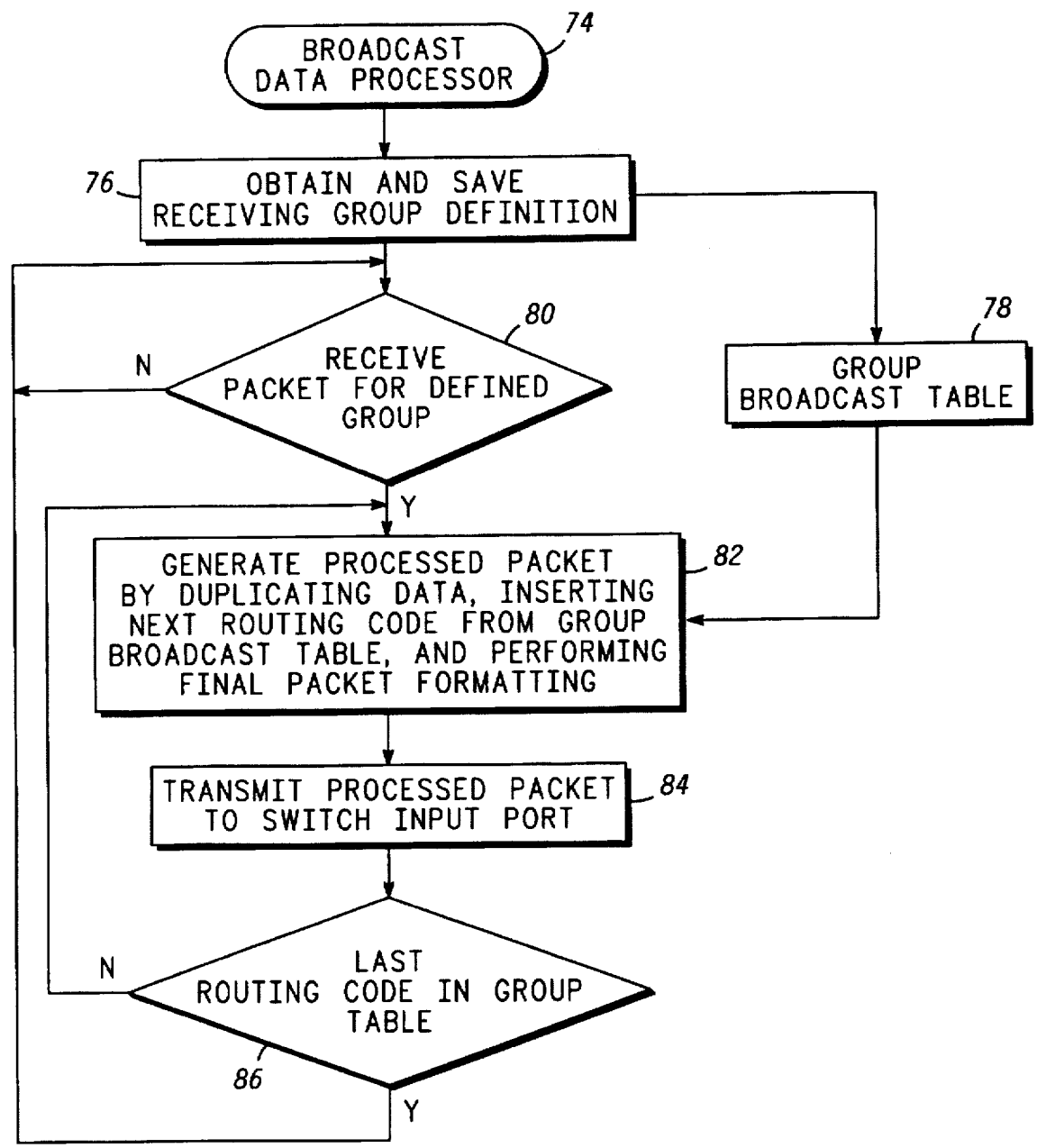
FIG. 6 shows a flow chart of a broadcast data processor process performed at a second embodiment of the data processor.

FIG. 6 shows a flow chart of a broadcast data processor process 74 performed at a data processor 20 which is configured to broadcast selected packets 34 (see FIG. 3). Process 74 may be defined through programming instructions or in other ways well known in the art.

Prior to actually broadcasting selected packets 34, process 74 performs a task 76. Task 76 obtains and saves a receiving group definition. The receiving group definition can originate from any node in network 10 and be saved in a group broadcast table 78. Table 78 may be implemented using a memory structure in a manner well known to those skilled in the art. Table 78 associates network node addresses with the defined group. The network node addresses may be either addresses for destination nodes 14 or other group addresses. The other group addresses identify other switching nodes 16 in network 10. Desirably, the network node addresses included in table 78 are local addresses to the switching node 16 performing process 74. In other words, addresses are included for destination nodes 14 and other switching nodes 16 that can be reached from this switching node 16 without going through other switching nodes 16 having a data processor 20 configured to perform data broadcasting. Thus, each receiving group definition stored at different switching nodes 16 to define routing for a particular set of broadcast data packets originating from a particular source node 12 is different from the others. Each definition desirably identifies destination nodes 14 and other switching nodes 16 which are local to the switching node 16 receiving the definition.

After the receiving group definition has been established, process 74 is ready to begin broadcasting selected data packets 34. Process 74 includes a query task 80 which determines when a selected packet 34 which needs to be broadcast arrives at data processor 20. Such a selected picket 34 arrives at data processor 20 through the operation of controller process 48 and switch 18, discussed above in connection with FIGS. 2–4. Process 74 progresses beyond task 80 to a task 82 when the packet 34 is received. Task 82 generates a processed packet. The processed packet is generated by duplicating data 38 (see FIG. 3) from the received packet 34 into the processed packet and inserting an appropriate routing code 40 (see FIG. 3) into the processed packet. The appropriate routing code 40 may be obtained from group broadcast table 78. In the embodiment of process 74 depicted in FIG. 6, processed packets are sequentially generated for each entry in the receiving group definition stored in table 78. Thus, task 82 can select a routing code 40 by getting the next entry in order from table 78. In addition, task 82 performs any other final packet formatting required for packets 34 transmitted through network 10. For example, a packet ID may be generated.

Next, a task 84 transmits the processed packet to the input port 22 of switch 18 (see FIGS. 1–2). Switch 18 will route the processed packet in accordance with the routing code inserted above in task 82. After task 84, a query task 86 determines whether the last processed packet broadcast was directed to the last routing code entry in table 78. So long as additional routing codes remain in table 78, program control loops back to task 82 to generate a processed packet for the additional routing codes. When a processed packet has been generated for the last routing code, program control loops back to task 80 to await the arrival of the next selected packet 34 which requires broadcasting.

Those skilled in the art will appreciate that the programming loops depicted in FIG. 6 may be broken through the inclusion of additional tasks. For example, process 74 can include additional tasks similar to those shown in FIG. 6 to permit concurrent service of multiple receiving group definitions. Programming loops for any single receiving group definition need not be broken until a receiving group definition is knocked down.

Accordingly, process 74 duplicates selected packets 34 as needed to broadcast the selected packets 34 to local nodes within network 10. Some of these local nodes can be other switching nodes 16 where other data processors 20 configured to perform data broadcasting functions are located. These other switching nodes 16 will broadcast those packets they receive to still other network nodes which are locally located to the other switching nodes 16. Through this process, communication links located near source node 12 in network 10 need not repetitively convey nearly identical packets because the packets are duplicated by network 10 as close to their intended destinations as possible.

Those skilled in the art will appreciate that network switching nodes 16 can be put to many diverse uses. For example, multiple pass processing may be implemented by repetitively looping packets through the same or different data processors (20) at a single switching node 16. For example, both error correction and broadcasting may be implemented at a single switching node 16. In addition, complex network processes may be implemented by having first stage processing performed at one switching node 16, second stage processing performed at another switching node 16, and so on. Network routing can be configured to that subsequent processing stages are performed at the switching nodes 16 which performed earlier stages.

In summary, the present invention provides an improved network node for packet switching with selective data processing and a corresponding method. Network packet switching nodes are provided to selectively perform data processing on user data conveyed by packets. These network packet switching nodes are distributed throughout a communication network. Network efficiency improves because the network then performs certain data processing functions on selected packets which, if performed by source and destination nodes, would lead to increased transporting of redundant user information. Moreover, the network packet switching nodes that selectively perform data processing on user data do not require substantially increased switch complexity.

The present invention has been described above with reference to preferred embodiments. However, those skilled in the art will recognize that changes and modifications may be made in these preferred embodiments without departing from the scope of the present invention. For example, the processes and tasks identified herein may be categorized and organized differently than described while achieving substantially equivalent results. Likewise, equivalent results can be achieved by configuring data processors to perform network processing functions other than those specifically discussed above. These and other obvious changes and modifications are intended to be included within the scope of the present invention.

What is claimed is:

1. A network packet switching node for switching packets which convey data and routing codes while selectively performing at least one non-switching network processing function on said data conveyed by selected ones of said packets, said node comprising:

a switching fabric having a plurality of input ports and a plurality of output ports;

a plurality data processors, each having an input coupled to one of said switching fabric output ports and each having an output coupled to one of said switching fabric input ports; and a controller coupled to said switching fabric to evaluate said routing codes and, when said routing codes command performance of said at least one network processing function, cause said switching fabric to route said selected packets which convey said routing codes that command performance of said at least one network processing function to a selected one data processor of said plurality of data processors, and wherein said controller is configured to select, when said routing codes command performance of said at least one network processing function, the selected one data processor of said plurality of data processors to route said selected packets.

2. A network packet switching node as claimed in claim 1 wherein said selected one data processor is configured to correct errors in said data conveyed by said selected packets.

3. A network packet switching node as claimed in claim 1 wherein said selected one data processor is configured to duplicate said data conveyed by said selected packets.

4. A network packet switching node as claimed in claim 1 wherein at least some of said data processors of said plurality are configured to perform said at least one network processing function, and wherein said controller selects an available one of said data processors when said routing codes command performance of said at least one network processing function.

5. A network packet switching node as claimed in claim 1 wherein a first set of said data processors of said plurality are configured to perform a first network processing function, and wherein a second set of data processor of said plurality is configured to perform a second network processing function, and wherein the controller selects said one data processor from either said first or second set of data processors based on said at least one network processing function.

6. A network packet switching node as claimed in claim 1 wherein said controller is configured so that when said routing codes do not command performance of said at least one network processing function, said controller causes said switch to route said packets which convey said routing codes that do not command performance of said at least one network processing function away from said data processors.

7. A method of operating a network packet switching node to switch packets which convey data and routing codes while selectively performing at least one non-switching network processing function on said data conveyed by selected ones of said packets, said method comprising the steps of:

coupling one of a plurality of data processors to a switch so that an input of said one data processor receives packets from one of a plurality of output ports of said switch and so that an output of said one data processor transmits packets to one of a plurality of input ports of said switch;

evaluating said routing codes of said packets;

controlling said switch so that when said routing codes command performance of said at least one network processing function, said selected packets which convey said routing codes that command performance of said at least one network processing function are routed from said switch to said data processor; and selecting, when said routing codes command performance of said at least one network processing function, said one data processor from said plurality of data processors for which to route said selected packets.

8. A method as claimed in claim 7 additionally comprising the steps of:

performing said at least one network processing function at said one data processor to generate a processed data packet; and routing said processed data packet from said one data processor to said switch.

9. A method as claimed in claim 8 wherein said controlling step is further configured so that when said routing codes do not command performance of said at least one network processing function, said switch routes said packets which convey said routing codes that do not command performance of said at least one network processing function away from said data processors.

10. A method as claimed in claim 8 wherein when said network processing function includes a broadcast function said performing step comprises the step of duplicating said data conveyed by said selected packets, wherein said processed data packet includes the duplicated data.

11. A method as claimed in claim 10 additionally comprising the step of repeating said performing and routing steps a plurality of times to make a plurality of duplicates of said data conveyed by said selected packets.

12. In a packet switching network having a source node, a destination node, and at least one intermediate switching node, said intermediate switching node having a data processor which performs a network processing function coupled to a switch, a method of transporting data from said source node to said destination node comprising the steps of:

forming, at said source node, a packet which includes said data and a routing code;

transmitting said packet to said intermediate switching node;

evaluating said routing code at said intermediate switching node; and if said evaluating step detects an instruction commanding performance of said network processing function, routing said packet through said switch to said data processor, performing said network processing function at said data processor to generate a processed packet, and routing said processed packet from said data processor through said switch toward said destination node and wherein said intermediate switching node has a plurality of data processors coupled to said switch, said plurality of data processors being configured to perform one or more network processing functions; and if said evaluating step detects said instruction commanding performance of said one or more network processing functions, said evaluating step comprises the step of determining to which of said plurality of data processors to route said packet.

13. A method as claimed in claim 12 wherein, if said evaluating step does not detect an instruction commanding the performance of said network processing function, said method comprises the steps of:

routing said packet through said switch toward said destination node; and avoiding said data processors in routing said packet through said switch toward said destination node.

14. A method as claimed in claim 12 wherein said performing step comprises the step of correcting errors in said data.

15. A method as claimed in claim 12 wherein said performing step comprises the step of duplicating said data in said packet.

16. A method as claimed in claim 12 wherein, if said evaluating step detects an instruction commanding performance of said network processing function, said method comprises the step of repeating said performing step and said routing step.

* * * * *